(12) United States Patent
Hong et al.

(10) Patent No.: US 10,175,810 B2
(45) Date of Patent: Jan. 8, 2019

(54) TOUCH SCREEN PANEL WITH TAIL AREA AND DISPLAY DEVICE COMPRISING THE SAME

(71) Applicant: LG DISPLAY CO., LTD., Seoul (KR)

(72) Inventors: Sunggon Hong, Seoul (KR); Jaedo Lee, Gyeonggi-do (KR); Namseok Lee, Seoul (KR); Dongjoong Cha, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 9 days.

(21) Appl. No.: 15/223,250

(22) Filed: Jul. 29, 2016

(65) Prior Publication Data

US 2017/0031522 A1 Feb. 2, 2017

(30) Foreign Application Priority Data

Jul. 30, 2015 (KR) ........................ 10-2015-0107934

(51) Int. Cl.
*G06F 3/041* (2006.01)

(52) U.S. Cl.
CPC .. *G06F 3/0416* (2013.01); *G06F 2203/04103* (2013.01)

(58) Field of Classification Search
CPC .................. G06F 3/0416; G06F 2203/04103
See application file for complete search history.

(56) References Cited

U.S. PATENT DOCUMENTS

| 2013/0194759 | A1* | 8/2013 | Kang | ..................... H05K 1/181 361/748 |
| 2014/0246687 | A1* | 9/2014 | Ha | ......................... G06F 1/1626 257/88 |
| 2015/0060256 | A1 | 3/2015 | Kim et al. | |
| 2015/0212614 | A1* | 7/2015 | Chen | ....................... G06F 3/044 345/174 |
| 2016/0147361 | A1 | 5/2016 | Ahn | |

FOREIGN PATENT DOCUMENTS

| CN | 104423760 A | 3/2015 |
| CN | 105632344 A | 6/2016 |
| EP | 2 765 450 A1 | 8/2014 |
| JP | 2015176314 A | 10/2015 |

OTHER PUBLICATIONS

Office Action dated Aug. 16, 2018, issued in counterpart Chinese Patent Application No. 201610619273.3.

* cited by examiner

*Primary Examiner* — Lisa Landis
(74) *Attorney, Agent, or Firm* — Morgan, Lewis & Bockius LLP

(57) ABSTRACT

A touchscreen panel includes touch sensors on a base film and routing wires connected to the touch sensors, wherein the base film has a main area and a tail area protruding from the main area, the main area includes an active region where the touch sensors are placed and a bezel region located on the outside of the active region, and the routing wires pass through the bezel region and the active region, and connect terminals provided at one end of the tail area and the touch sensors.

15 Claims, 17 Drawing Sheets

TOUCH SCREEN PANEL WITH TAIL AREA AND DISPLAY DEVICE COMPRISING THE SAME

This application claims the priority benefit of Korean Patent Application No. 10-2015-0107934 filed on Jul. 30, 2015, which is incorporated herein by reference for all purposes as if fully set forth herein.

BACKGROUND OF THE INVENTION

Field of the Invention

The present disclosure relates to a display device, and more particularly, to a touch screen panel with a tail area and a display device comprising the same.

Discussion of the Related Art

User interfaces (UI) enable humans (users) to interact with various types of electrical and electronic devices and easily control them as they want. Typical examples of the user interfaces include keypads, keyboards, mice, on-screen displays (OSD), and remote controllers with an infrared communication capability or radio frequency (RF) communication capability. The user interface technology is continuously developing to improve user sensation and ease of operation. Recently, user interfaces have been evolving into touch UI, voice recognition UI, 3D UI, etc.

The touch UI has been indispensably used in portable information appliances, and moreover it has been extensively applied in almost all types of home appliances. A capacitive touch sensing system can be used in a variety of applications, with its touchscreen panel structure that offers higher durability and optical clarity than a traditional resistive touch sensing system and is capable of multi-touch detection and hover detection.

Such a touchscreen panel is facing a number of problems since it has many parts mounted in it. Examples of these problems include the rise in manufacturing costs due to the increasing number of parts, the increase in the number of processes for mounting the parts and the resulting increase in process defects, and the increasing structural constraints on part placement. This may reduce the safety and reliability of the product, so there is a need for solutions to address these problems.

SUMMARY

Accordingly, the present invention is directed to a touch screen panel and a display comprising the same that substantially obviate one or more of the problems due to limitations and disadvantages of the related art.

An object of the present invention is to provide a touchscreen panel which provides a simplified connection between touch sensors and a main board, and a display device comprising the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touchscreen panel comprises touch sensors on a base film and routing wires connected to the touch sensors, wherein the base film comprises a main area and a tail area protruding from the main area, the main area comprises an active region where the touch sensors are placed and a bezel region located on the outside of the active region, and the routing wires pass through the bezel region and the active region, and connect terminals provided at one end of the tail area and the touch sensors.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. In describing various embodiments, descriptions of the same or like parts will be made representatively in the first exemplary embodiment, but omitted in other embodiments.

Prior to describing exemplary embodiments of the present invention, problems associated with making space for a pad portion occupying part of a touchscreen panel and problems occurring when connecting the pad portion and a flexible printed circuit board will be discussed.

Hereinafter, a touchscreen panel with a pad portion and a flexible printed circuit board will be described with reference to FIGS. 1 through 6. FIGS. 1 through 6 are views for explaining problems suffered by a touchscreen panel with a pad portion and a flexible printed circuit board.

Figure 1:
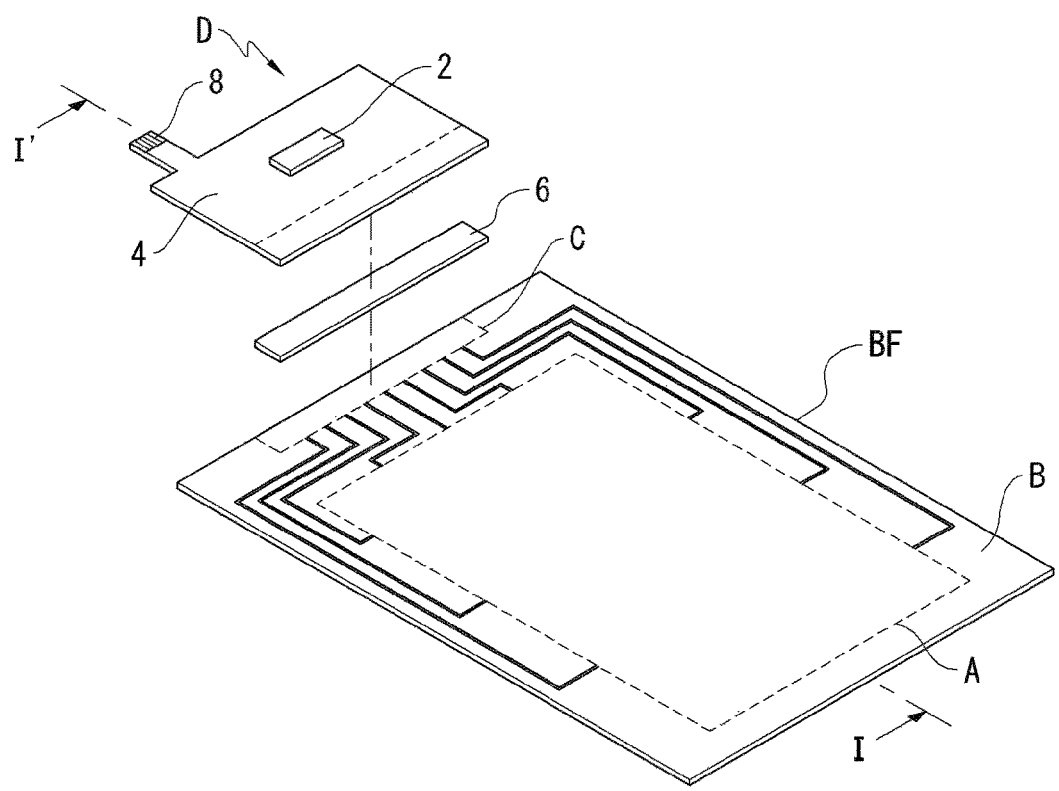
FIGS. 1 through 6 are views for explaining problems suffered by a touchscreen panel with a pad portion and a flexible printed circuit board.
Figure 2:
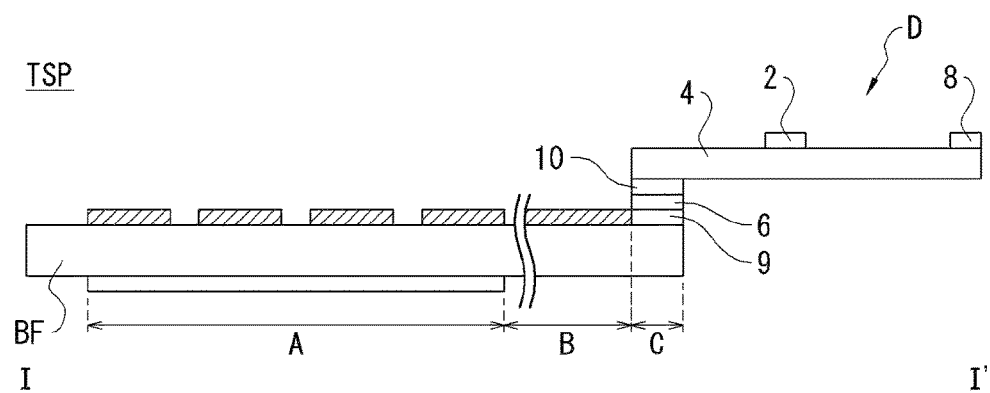

Referring to FIGS. 1 and 2, the touchscreen panel comprises an electrode portion A, a routing wiring portion B, a pad portion C, and a driving portion D.

The electrode portion A (or active region) comprises a plurality of touch sensors formed on a base film BF. The touch sensors may comprise capacitive sensors or self-capacitance sensors. The routing wiring portion B (or bezel region) is located on the outside of the electrode portion A. The routing wiring portion B comprises a plurality of routing wires respectively connected to the touch sensors in the electrode portion A. The pad portion C is placed on one side of the base film BF. The pad portion C comprises a plurality of pads respectively and electrically connected to the plurality of touch sensors through the plurality of routing wires.

The driving portion D comprises a touch integrated circuit 2 and a flexible printed circuit board (FPCB) 4 with the touch integrated circuit 2 mounted on it. The touch integrated circuit 2 sends and receives a touch signal for activating the touch sensors in synchronization with a control signal from a main board. To this end, one end of the flexible printed circuit board 4 is electrically connected to the pad portion C of the base film BF, and the other end is electrically connected to the main board. To electrically connect one end of the flexible printed circuit board 4 and the pad portion C, an ACF (anisotropic conductive film) 6 is interposed between first pads 9 on the pad portion C and second pads 10 on the flexible printed circuit board 4. To electrically connect the flexible printed circuit board 4 and the main board of a display device, terminals 8 are provided at the other end of the flexible printed circuit board 4, and the terminals 8 are detachably inserted into a connector on the main board.

The capacitive touchscreen panel thus constructed is faced with the problem of making enough space for the plurality of first pads 9, and suffers from low product reliability due to poor contact which makes the first pads 9 and the second pads 10 non-conductive.

Figure 3:
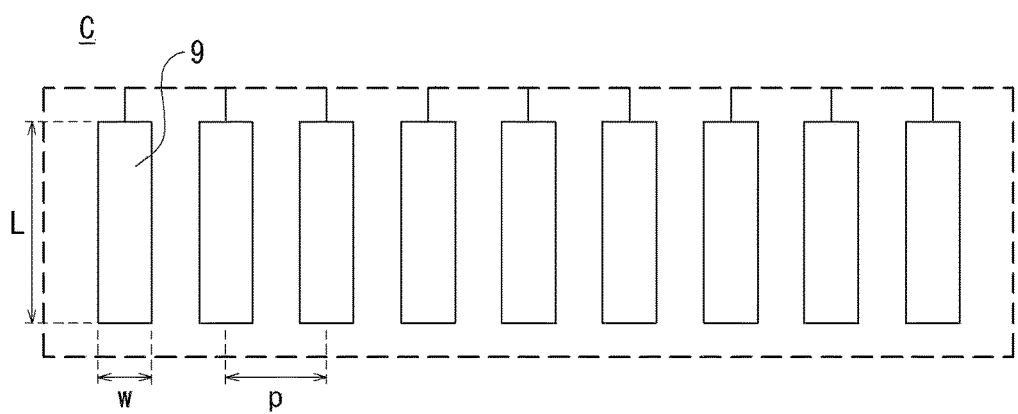
Figure 4:
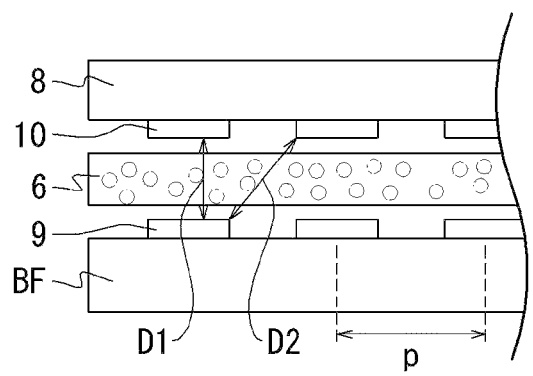

Referring to FIGS. 3 and 4, each of the first pads 9 should be of sufficient width w and length L to ensure enough contact area for preventing poor contact with the second pads, taking into account alignment and process margin from the second pads 10 on the flexible printed circuit board 4. Also, the first pads 9 and the second pads 10 are attached in one direction D1 through conductive balls in the ACF 6. However, if the distance p between adjacent pads is not enough, the first pads 9 and the second pads 10 may be attached in another direction D2, causing a poor contact. Thus, each of the first pads 9 should be kept at enough distance p from the adjacent first pads 9.

There is a recent trend towards adding more and more touch sensors to enhance touch sensitivity, thus leading to an increase in the number of first pads 9 connected to the touch sensors through routing wires. In this case, the area of the pad portion C where the first pads 9 are formed will increase considerably. The increase in the area of the pad portion C causes an increase in the size of the bezel region. The bezel region is a region in the display device that displays no image. The increased size of the bezel region degrades the aesthetic quality of the display device.

Figure 5:
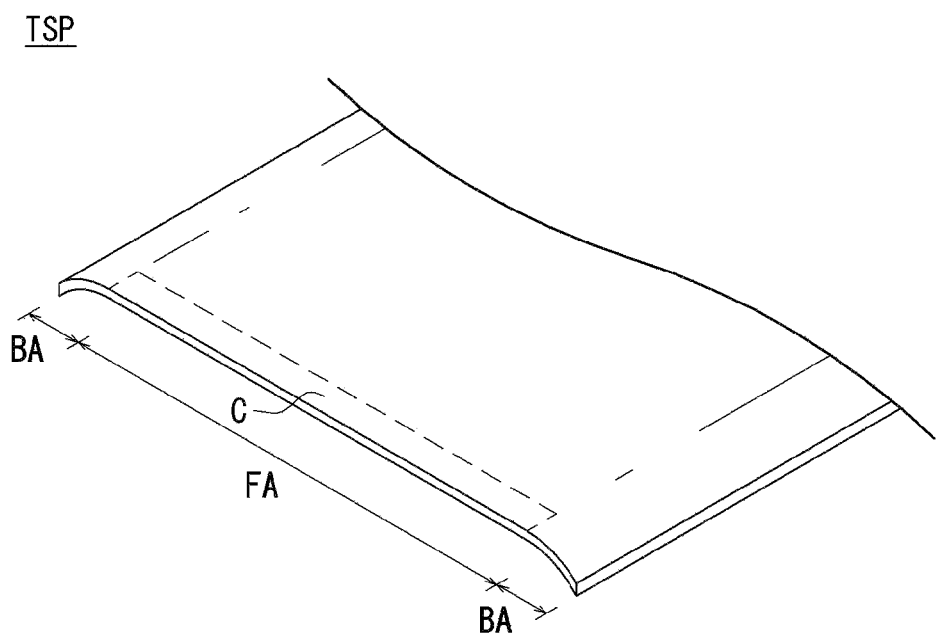

Referring to FIG. 5, a bended display is currently under development. The bended display has a bended touchscreen panel for sensing touch input in a curved area BA, as well as in a flat area FA. However, the bended display has spatial constraints because, in the curved area BA, it is hard to form the first pads 9 and perform ACF bonding. In other words, in the case of the bended display, the pad portion C is provided only in the flat area F, so making space for the pad portion C will increase the size of the display device, which wouldn't have been necessary if not for the bended display.

Figure 6:
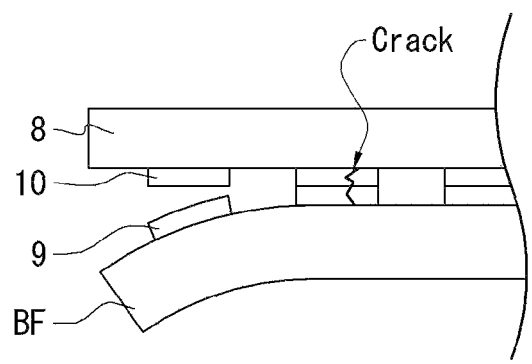

Besides, a freely bendable, flexible display is currently under development. Referring to FIG. 6, when using the flexible display device, if a portion close to the pad portion C is bent, the first pads 9 and second pads 10 bonded together by a bonding process may be separated from each other, or the first pads 9 and second pads 10 may have cracks. This may result in a decrease in touch sensitivity caused by poor contact, etc. The present invention has been devised to overcome this problem.

Figure 7:
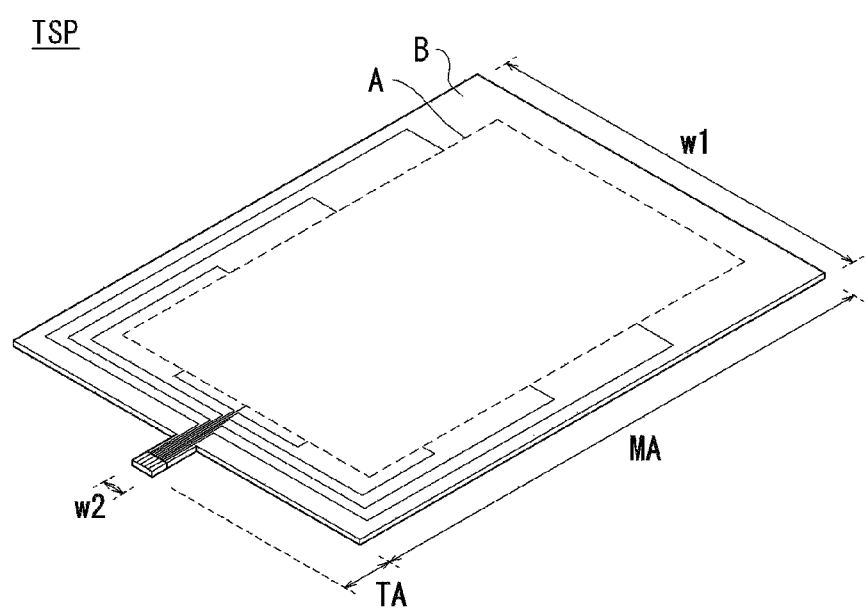
FIG. 7 is a perspective view of a touchscreen panel according to the present invention.

Now, a touchscreen panel TSP according to the present invention will be described with reference to FIG. 7. FIG. 7 is a perspective view of a touchscreen panel according to the present invention.

Referring to FIG. 7, the touchscreen panel according to the present invention comprises touch sensors formed on a base film BF and routing wires connected to the touch sensors.

The base film BF is made of flexible material that can bend. For example, the base film BF may comprise, but is not limited to, polyethyelene terephthalate (PET), poly carbonate (PC), cyclic olefin polymer (COP), cellulose acetate propionate (CAP), polyethersulphone (PES), polyacrylate (PAR), polyetherimide (PEI), polyethyelenen napthalate (PEN), polyphenylene sulfide (PPS), polyallylate, polyimide, cellulose triacetate (TAC), a polarizing film, etc.

The base film BF comprises a main area MA and a tail area TA protruding from the main area MA. The tail area TA extends from one side of the main area MA. The main area MA comprises an active region A where touch sensors are placed, and a bezel region B located on the outside of the active region A. The active region A corresponds to an image display area on the display panel.

A plurality of touch sensors are placed in the active region A. The touch sensors may comprise at least either self-capacitance sensors or mutual capacitance sensors. A mutual capacitance sensor comprises mutual capacitance that occurs between two electrodes. In a mutual capacitance sensing circuit, an activation signal (or stimulus signal) is applied to one of the two electrodes, and touch input is sensed through the other electrode, based on a change in the amount of electric charge at the mutual capacitance. When a conductor comes close to the mutual capacitance, the amount of electric charge at the mutual capacitance is reduced. In this way, touch input or gestures can be detected.

A self-capacitance sensor comprises self-capacitance that occurs at each sensor electrode. In a self-capacitance sensing circuit, an electric charge is supplied to each sensor electrode, and touch input is detected based on a change in the amount of electric charge at the self-capacitance. When a conductor comes close to the self-capacitance, the capacitance increases as the capacitance caused by the conductor is connected in parallel to the capacitance of the sensor. That is, in the self-capacitance sensing circuit, the capacitance of the sensor increases when touch input is detected.

The bezel region B is located on the outside of the active region A. A plurality of routing wires respectively connected to the touch sensors in the active region A are placed in the bezel region B.

The routing wires may have a minimum line width and minimum distance between each that are allowed for the process, in order to minimize the bezel region B. But, the line width and thickness of the routing wires may be determined in consideration of resistance. The routing wires may be made of flexible material. For example, the routing wires may comprise, but are not limited to, one of the following: metal nano wires, metal meshes, and carbon nano tubes (CNT).

The tail area TA comprises terminals provided at one end and routing wires connected to the terminals. The routing wires formed in the bezel region B are extended and placed in the tail area TA. The routing wires pass through the bezel region B of the main area MA and the tail area TA, and connect the touch sensors and the terminals provided at one end of the tail area TA.

The width w2 of the tail area TA is smaller than the width w1 of the main area MA. The tail area TA may have a minimum possible width w2 just enough to contain the routing wires respectively connected to the touch sensors. Accordingly, the present invention gives the tail area TA flexibility.

Figure 8:
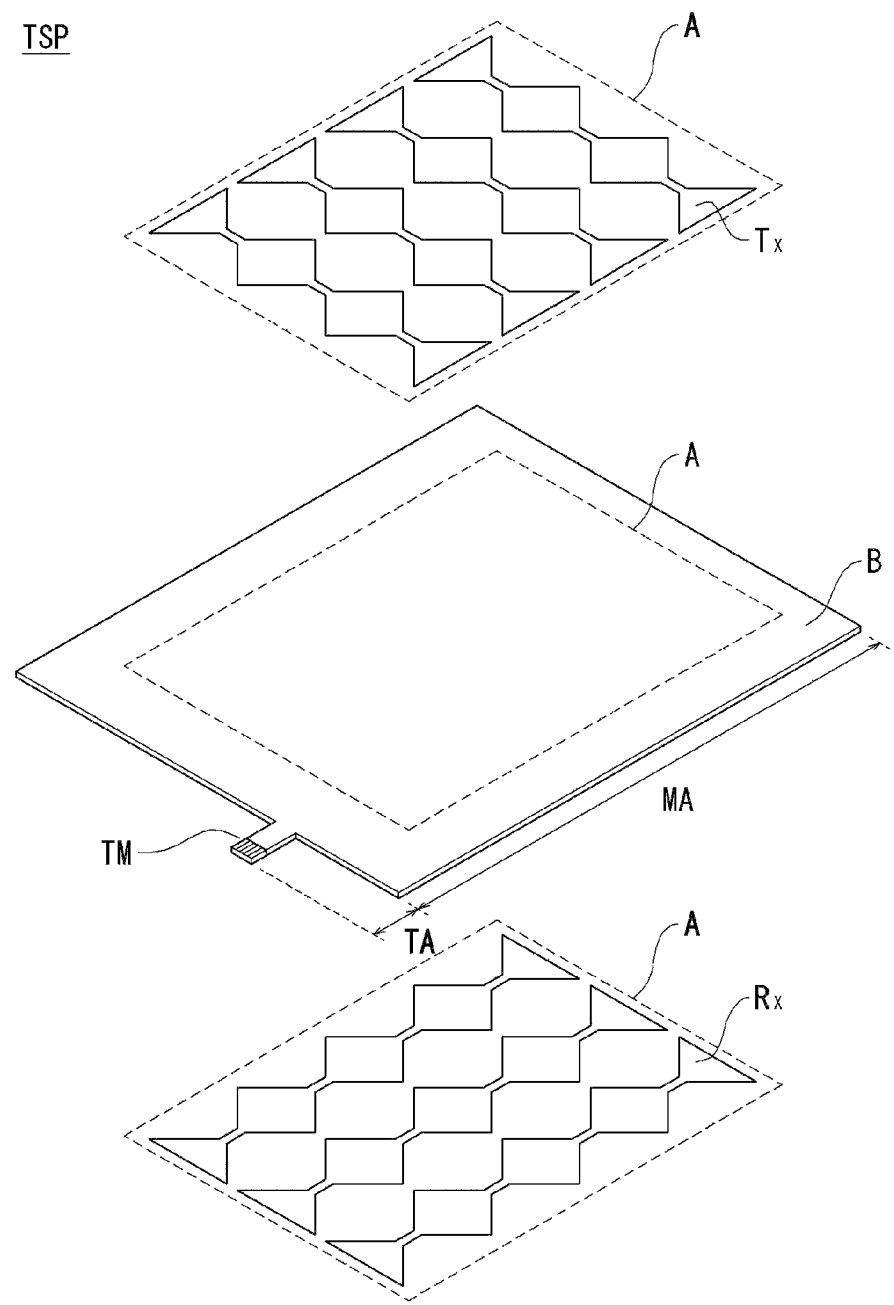
FIGS. 8 and 9 are views illustrating a touchscreen panel according to an exemplary embodiment of the present invention.
Figure 9:
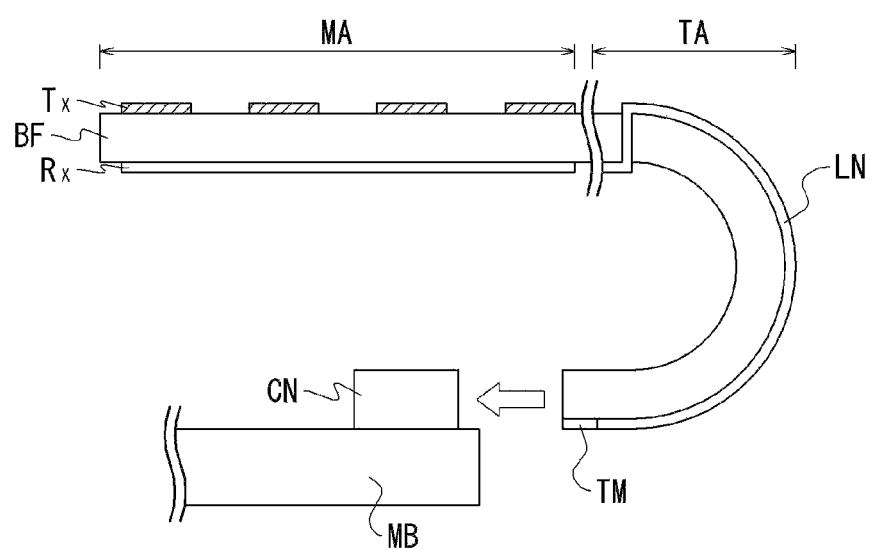

Now, the touchscreen panel TSP according to the present invention will be described in detail with further reference to FIGS. 8 and 9. FIGS. 8 and 9 are views illustrating a touchscreen panel according to an exemplary embodiment of the present invention.

Referring to FIGS. 8 and 9, the touchscreen panel TSP according to the present invention may comprise a base film BF, first electrode lines Tx, and second electrode lines Rx crossing the first electrode lines Tx. The first electrode lines Tx are provided on the upper surface of the base film BF. The second electrode lines Rx are provided on the lower surface of the base film BF.

The first routing wires connected to the first electrode lines Tx pass through the bezel region B and the tail area TA, and are connected to the terminals TM provided on top of one end of the tail area TA. Second routing wires LN connected to the second electrode lines Rx pass through the routing wiring portion B, and are connected to the terminals TM provided on top of one end of the tail area TA. The second routing wires LN connect the second electrode lines Rx and the terminals TM provided on top of one end of the tail area TA, through via holes penetrating the base film BF.

The tail area TA may be bent corresponding to the position of the main board MB. The terminals TM provided at one end of the tail area TA may be detachably inserted into a connector CN on the main board MB. For example, a touch integrated circuit may be mounted on the main board MB. The touch integrated circuit may send and receive a touch signal for activating the touch sensors in synchronization with a control signal.

As discussed above, the base film BF and the routing wires may be made of flexible material and bend in a variety of directions. Accordingly, the present invention can prevent cracking or breakage which may occur to the tail area TA and/or routing wires upon bending.

The touchscreen panel TSP according to the present invention requires no electrical connector such as a flexible printed circuit board as it is connected directly to the main board MB by the terminals TM at the tail area TA. Therefore, the present invention can reduce the number of parts, thereby reducing the manufacturing costs and making the display device lightweight and thin.

Figure 10:
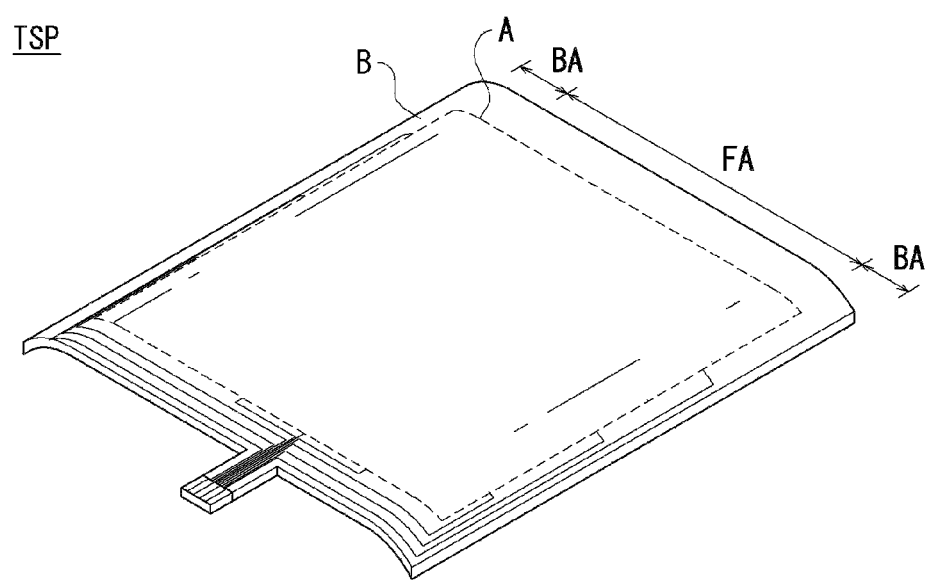
FIG. 10 is a view for explaining benefits of a touchscreen panel according to an exemplary embodiment of the present invention.

The touchscreen panel TSP according to the present invention requires no process of joining pads, such as ACF bonding. Accordingly, the present invention can achieve process simplification and reduce the tact time for making the product. Moreover, the present invention can improve product reliability since it minimizes errors in the process. For instance, in the present invention, the curved area BA on the bended touchscreen panel TSP only requires space for forming the routing wires LN (in FIG. 9), as shown in FIG. 10, so any errors during the pad formation and bonding in the curved area BA can be avoided.

The present invention can reduce spatial constraints and enhance the degree of freedom of part placement because it takes advantage of the existing space for forming the pad portion C (of FIG. 1). Also, the present invention has the advantage of reducing the bezel region by eliminating the existing space for forming the pad portion.

Figure 11:
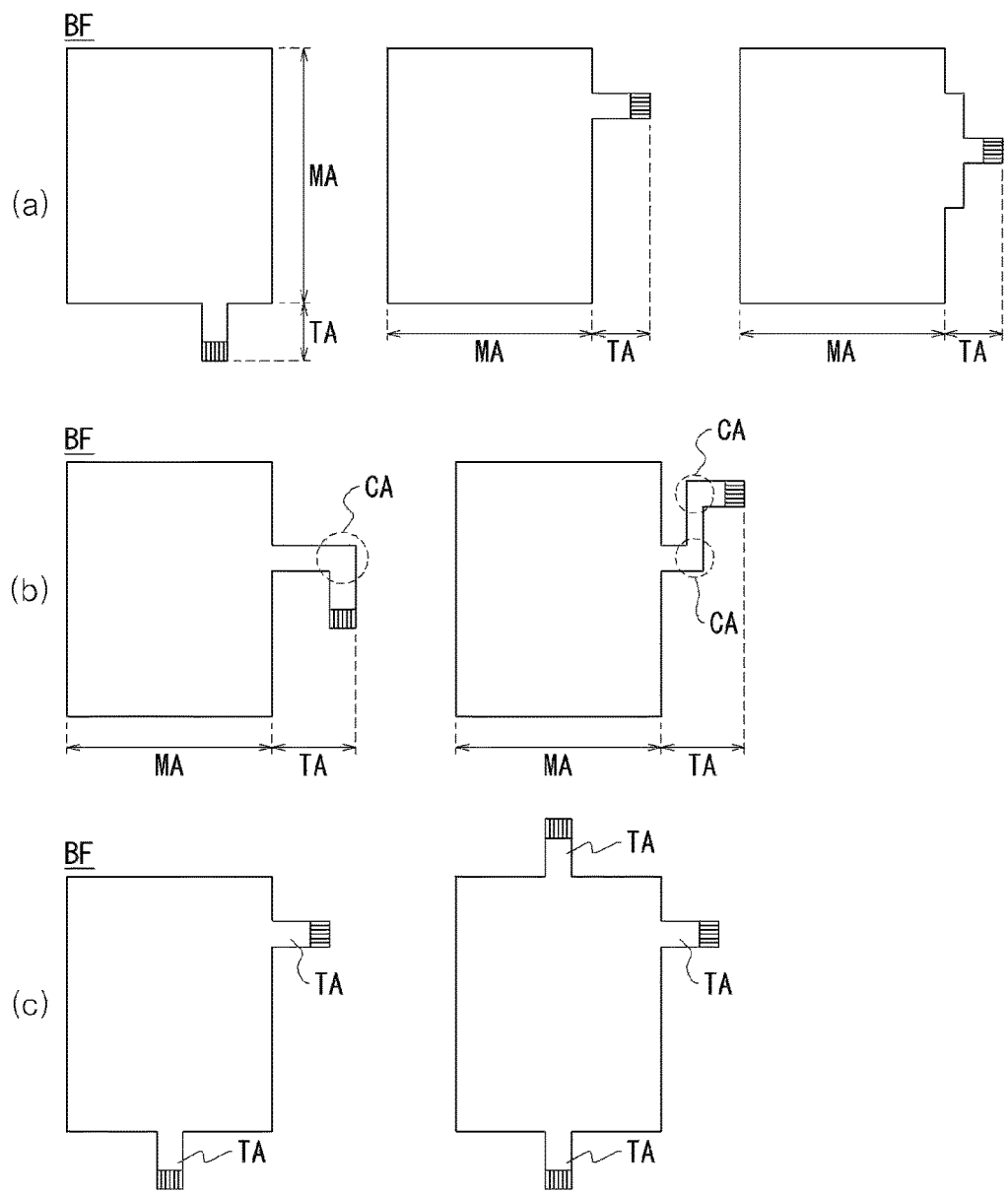
FIG. 11 provides views for explaining a variety of shapes of a base film.

Referring to FIG. 11, the shape of the base film BF will now be described. FIG. 11 provides views for explaining a variety of shapes of a base film.

The base film BF may be formed in different shapes at different positions according to the designer's needs. The tail area TA provided on one side of the base film BF may be formed by taking into account spatial and structural constraints including the position of the main board, the relationship with other structural components, etc.

Referring to portion (a) of FIG. 11, the tail area TA may extend outward from at least one side of the main area MA. The tail area TA may have a planar polygon shape including a rectangle, a pentagon, etc.

Referring to portion (b) of FIG. 11, the tail area TA may comprise at least one bent portion CA in the same plane. That is, the tail area TA may extend from one side of the main area MA and bent in a series of one or more different directions.

Referring to portion (c) of FIG. 11, the base film BF may comprise a plurality of tail areas TA. The base film BF may comprise a plurality of tail areas TA that extend from different positions on the main area MA and are separated from each other.

In the related art, an electrical connector (e.g., a flexible printed circuit board) was needed to connect the touchscreen panel TSP and the main board. Such an electrical connector has many spatial constraints since it can only be placed where there is space for the pad portion. In contrast, in the present invention, forming the tail area TA on one side of the main area MA when forming the base film BF will suffice in order to connect the touchscreen panel TSP and the main board. Therefore, the present invention can enhance the degree of freedom and design convenience of the touchscreen panel TSP.

Hereinafter, examples of application of the touchscreen panel TSP according to the present invention will be described by exemplary embodiments of the present invention.

<First Exemplary Embodiment>

Referring to FIGS. 12 to 15, a display device comprising a touchscreen panel TSP according to a first exemplary embodiment of the present invention will now be described. FIGS. 12 to 15 are views for explaining a display device comprising a touchscreen panel according to a first exemplary embodiment of the present invention.

The display device according to the first exemplary embodiment of the present invention comprises a display panel with pixels embedded in it to display an input image and a touchscreen panel TSP bonded onto the display panel.

The display device of this invention may be implemented as a liquid crystal display (LCD), a field emission display (FED), a plasma display panel (PDP), an organic light-emitting display (OLED), an electrophoresis (EPD) display, etc. It should be noted that the first exemplary embodiment of the present invention is described with, but not limited to, an example where the display panel comprises a liquid crystal display.

Figure 12:
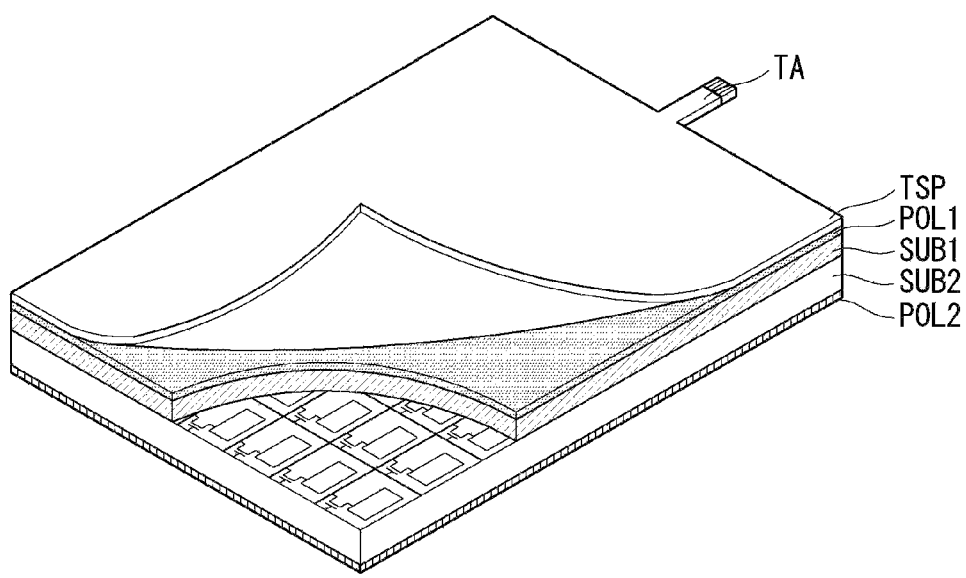
FIGS. 12 to 15 are views for explaining a display device comprising a touchscreen panel according to a first exemplary embodiment of the present invention.

Referring to FIG. 12, the touchscreen panel TSP according to the first exemplary embodiment of the present invention is an add-on touchscreen panel. In the add-on touchscreen panel, the display panel and the touchscreen panel TSP are separately manufactured, and then the touchscreen panel TSP is attached to the top of the display panel. An add-on display device further comprises a polarizing film POL1 bonded onto the display panel. In this instance, the touchscreen panel TSP is bonded onto the polarizing film POL1. In FIG. 12, "PIX" refers to a pixel electrode of a liquid crystal cell, "SUB2" refers to a lower substrate, and "POL2" refers to a lower polarizing film.

The display panel comprises a liquid crystal layer formed between two substrates SUB1 and SUB2. A pixel array on the display panel comprises pixels that are formed in pixel areas defined by data lines and gate lines. Each pixel comprises TFTs (thin film transistors) formed at the intersections of the data lines and gate lines, a pixel electrode to be charged with a data voltage, and a storage capacitor Cst connected to the pixel electrode to maintain the voltage of the liquid crystal cell.

A black matrix, color filters, etc. are formed on the upper substrate SUB1 of the display panel. The lower substrate SUB2 of the display panel may be implemented in a COT (color filter on TFT) structure. In this case, the color filters may be formed on the lower substrate SUB2 of the display panel. A common electrode to which a common voltage is supplied may be formed on the upper substrate SUB1 or lower substrate SUB2 of the display panel. Polarizing films are respectively attached to the upper and lower substrates SUB1 and SUB2 of the display panel, and alignment films for setting a pre-tilt angle of liquid crystals are respectively formed on the inner surfaces contacting the liquid crystals. A column spacer is formed between the upper and lower substrates SUB1 and SUB2 of the display panel to maintain a cell gap for the liquid crystal cell.

A backlight unit may be disposed under the back of the display panel. The backlight unit is an edge-type or direct-type backlight unit which illuminates the display panel. The display panel may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

Figure 13:
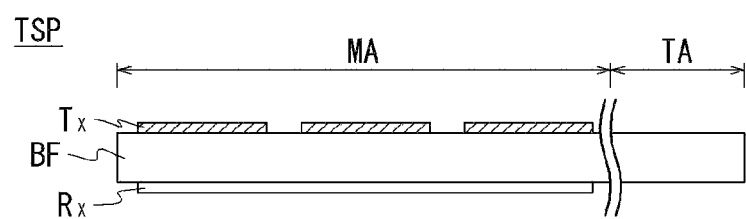
Figure 14:
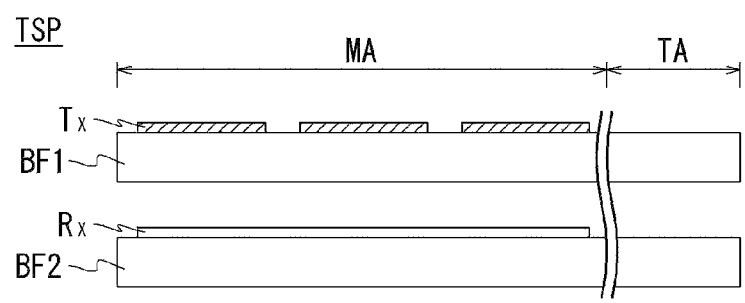
Figure 15:
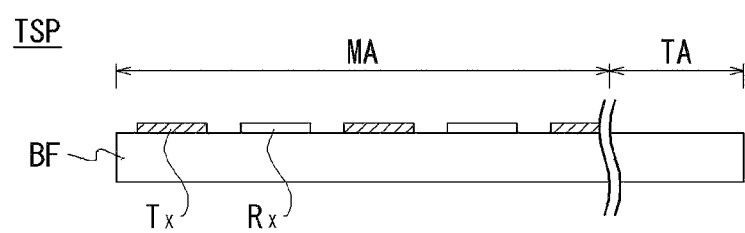

Referring to FIGS. 13 through 15, an electrode structure for an add-on touchscreen panel TSP will be described below. The touchscreen panel TSP according to the first exemplary embodiment of the present invention may comprise various electrode structures as shown in FIGS. 13 through 15.

Referring to FIG. 13, the add-on touchscreen panel TSP comprises a base film BF, first electrode lines Tx, and second electrode lines Rx crossing the first electrode lines Tx. The first electrode lines Tx are provided on the upper surface of the base film BF. The second electrode lines Rx are provided on the lower surface of the base film BF. The first electrode lines Tx and the second electrodes lines Rx are insulated from each other.

Referring to FIG. 14, the add-on touchscreen panel TSP comprises a first base film BF1 and a second base film BF2. First electrode lines Tx are placed on the first base film BF1, and second electrode lines Rx crossing the first electrode lines Tx are placed on the second base film BF2. The first base film BF1 and the second base film BF2 may be bonded together by an adhesive layer interposed between them.

Referring to FIG. 15, the add-on touchscreen panel TSP comprises a base film BF, first electrode lines Tx, and second electrode lines Rx crossing the first electrode lines Tx. The first electrode lines Tx and the second electrode lines Rx are provided on one surface of the base film BF. In this case, either the first electrode lines Tx or the second electrode lines Rx are separated from each other, and the separated electrode lines are electrically connected by a bridge pattern. The first electrode lines Tx and the second electrode lines Rx are insulated from each other by an insulating film.

<Second Exemplary Embodiment>

Figure 16:
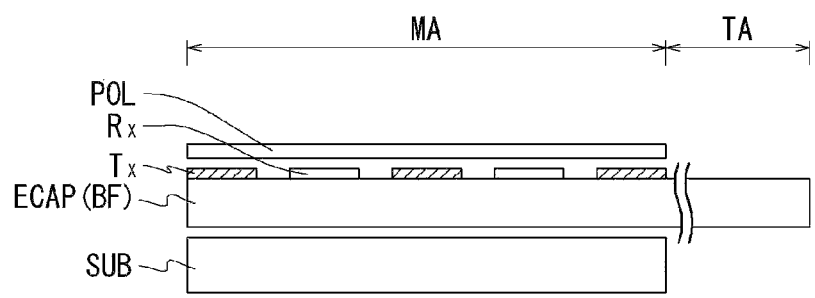
FIG. 16 is a view for explaining a display device comprising a touchscreen panel according to a second exemplary embodiment of the present invention.

Referring to FIG. 16, a display device comprising a touchscreen panel TSP according to a second exemplary embodiment of the present invention will now be described. FIG. 16 is a view for explaining a display device comprising a touchscreen panel according to a second exemplary embodiment of the present invention.

The display device according to the second exemplary embodiment of the present invention may be implemented as an organic light-emitting diode display. The display device according to the second exemplary embodiment of the present invention comprises a display panel which has pixels placed on a thin film transistor (hereinafter, "TFT") substrate SUB and touch sensors placed on a base film BF of flexible material covering the pixels. The display device according to the second exemplary embodiment of the present invention further comprises a polarizing film POL placed over the base film BF, and the touch sensors are placed on the upper surface of the base film BF, between the base film BF and the polarizing film POL.

Referring to FIG. 16, the touchscreen panel TSP according to the second exemplary embodiment of the present invention is an on-cell touchscreen panel. In the on-cell touchscreen panel, elements constituting a touch sensor are formed directly on the upper surface of an encapsulation substrate ECAP of the display panel.

The TFT substrate SUB of the display panel comprises pixels formed in pixel regions defined by data lines and gate lines. Each pixel comprises an OLED (organic light-emitting diode; hereinafter, "OLED"), which is a self-luminous element. The OLED comprises an anode, a cathode, and an organic compound layer interposed between the anode and cathode. The organic compound layer may comprise an emission layer EML, and may further comprise a common layer. The common layer may comprise at least one selected from the group consisting of a hole injection layer HIL, a hole transport layer HTL, an electron transport layer ETL, and an electron injection layer EIL.

On the display panel, pixels each comprising an OLED are arranged in a matrix, and the luminance of the pixels is adjusted depending on the grayscale value of video data. Each pixel comprises a driving TFT that controls drive current flowing through the OLED depending on a gate-source voltage, a storage capacitor that keeps the gate-source voltage of the driving TFT constant for one frame, and at least one switching TFT that programs the gate-source voltage of the driving TFT I response to a gate pulse (or scan pulse). The drive current is determined by the gate-source voltage of the driving TFT relative to a data voltage and the threshold voltage of the driving TFT, and the luminance of the pixels is proportional to the amount of drive current flowing through the OLED.

The encapsulation substrate ECAP of the display panel is placed on top of the TFT substrate SUB where pixels are formed. The encapsulation substrate ECAP is placed to protect the elements inside the display panel from the outside. In the on-cell touchscreen panel, the encapsulation substrate ECAP may be the base film BF of the touchscreen panel TSP according to the present invention. That is, the base film BF according to the present invention is used as the encapsulation substrate ECAP, and electrode lines are provided on the upper surface of the encapsulation substrate ECAP.

The electrode lines provided on the upper surface of the encapsulation substrate ECAP comprises first electrode lines Tx and second electrode lines Rx crossing the first electrode lines Tx. In this case, either the first electrode lines Tx or the second electrode lines Rx are separated from each other, and the separated electrode lines are electrically connected by a bridge pattern. The first electrode lines Tx and the second electrode lines Rx are insulated from each other by an insulating film.

<Third Exemplary Embodiment>

Figure 17:
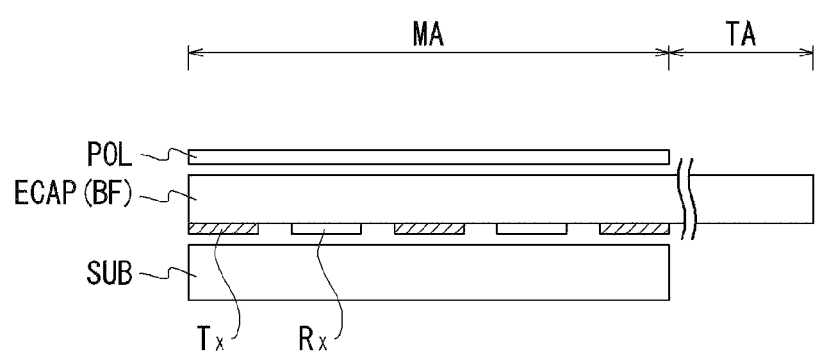
FIG. 17 is a view for explaining a display device comprising a touchscreen panel according to a third exemplary embodiment of the present invention.

Referring to FIG. 17, a display device comprising a touchscreen panel TSP according to a third exemplary embodiment of the present invention will now be described. FIG. 17 is a view for explaining a display device comprising a touchscreen panel according to a third exemplary embodiment of the present invention. In describing the third exemplary embodiment, redundancies between the second and third exemplary embodiments will be omitted.

The display device according to the third exemplary embodiment of the present invention may be implemented as an organic light-emitting diode display. The display device according to the third exemplary embodiment of the present invention comprises a display panel, which comprises pixels placed on a thin film transistor (hereinafter, "TFT") substrate SUB and touch sensors placed on a base film BF of flexible material covering the pixels. In the display device according to the third exemplary embodiment of the present invention, the touch sensors are placed on the lower surface of the base film BF facing the TFT substrate SUB.

Referring to FIG. 17, the touchscreen panel TSP according to the third exemplary embodiment of the present invention is an integrated touchscreen panel. In the integrated touchscreen panel, touch sensors are embedded within the display device, thereby making the display thin and enhancing durability.

The encapsulation substrate ECAP of the display panel is placed on top of the TFT substrate SUB where pixels are formed. The encapsulation substrate ECAP is placed to protect the elements inside the display panel from the outside. In the integrated touchscreen panel, the encapsulation substrate ECAP may be the base film BF of the touchscreen panel TSP according to the present invention. That is, the base film BF according to the present invention is used as the encapsulation substrate ECAP, and electrode lines are provided on the lower surface of the encapsulation substrate ECAP.

The electrode lines provided on the lower surface of the encapsulation substrate ECAP comprises first electrode lines Tx and second electrode lines Rx crossing the first electrode lines Tx. In this case, either the first electrode lines Tx or the second electrode lines Rx are separated from each other, and the separated electrode lines are electrically connected by a bridge pattern. The first electrode lines Tx and the second electrode lines Rx are insulated from each other by an insulating film.

It will be apparent to those skilled in the art that various modifications and variations can be made in the touch screen panel and the display device comprising the same of the present invention without departing from the spirit or scope of the invention. Thus, it is intended that the present invention cover the modifications and variations of this invention provided they come within the scope of the appended claims and their equivalents.

What is claimed is:

1. A touchscreen panel which comprises touch sensors on a base film and routing wires connected to the touch sensors, wherein the base film comprises a main area and a tail area protruding from the main area,
the main area comprises an active region where the touch sensors are placed and a bezel region located on the outside of the active region, and
the routing wires pass through the bezel region and the tail area, and connect terminals provided at one end of the tail area and the touch sensors,
wherein the routing wires connect to the touch sensors through via holes that penetrate the base film; and
wherein:
the touch sensors comprise:
first electrode lines provided on an upper surface of the base film; and
second electrode lines provided on a lower surface of the base film, and the routing wires comprise:
first routing wires provided on the upper surface of the base film and connected to the first electrode lines; and
second routing wires provided on the upper surface of the base film and connected to the second electrode lines through the via holes.

2. The touchscreen panel of claim 1, wherein the base film comprises a plurality of tail areas that extend from the main area and are separated from each other.

3. The touchscreen panel of claim 1, wherein the tail area comprises at least one bent portion in the same plane.

4. The touchscreen panel of claim 1, wherein the tail area has a planar polygon shape including a rectangle and a pentagon.

5. The touchscreen panel of claim 1, wherein the terminals are detachably inserted into a connector on the main board to receive signals, and the routing wires are narrower in width than the terminals.

6. The touchscreen panel of claim 1, wherein the base film comprises one of the following: polyethyelene terephthalate (PET), poly carbonate (PC), and cyclic olefin polymer (COP).

7. The touchscreen panel of claim 1, wherein the routing wires comprise either metal nano wires or metal meshes.

8. The touchscreen panel of claim 1, wherein the tail area is narrower in width than the main area.

9. A display device which comprises a display panel with pixels embedded therein to display an input image and a touchscreen panel disposed on the display panel,
the touchscreen panel comprising:
touch sensors on a base film; and
routing wires connected to the touch sensors,
wherein the routing wires connect to the tough sensors through via holes that penetrate the base film,
wherein the base film comprises a main area and a tail area protruding from the main area,
the main area comprises an active region where the touch sensors are placed and a bezel region located on the outside of the active region, and
the routing wires pass through the bezel region and the tail area, and connect terminals provided at one end of the tail area and the touch sensors,
wherein:
the touch sensors comprise:
first electrode lines provided on an upper surface of the base film; and
second electrode lines provided on a lower surface of the base film, and the routing wires comprise:
first routing wires provided on the upper surface of the base film and connected to the first electrode lines; and second routing wires provided on the upper surface of the base film and connected to the second electrode lines through the via holes.

10. The display device of claim 9, further comprising a polarizing film interposed between the touchscreen panel and the display panel.

11. The display device of claim 9, wherein the display panel comprises either a liquid crystal display or an organic light-emitting diode display.

12. A display device which comprises pixels arranged on a TFT substrate and touch sensors disposed on a base film covering the pixels,
wherein the base film comprises a main area and a tail area protruding from the main area,
the main area comprises an active region where the touch sensors are placed and a bezel region located on the outside of the active region, in which routing wires connected to the touch sensors are placed,
the routing wires pass through the bezel region and the tail area, and connect terminals provided at one end of the tail area and the touch sensors, and
the routing wires connect to the touch sensors through via holes that penetrate the base film,
wherein:
the touch sensors comprise:
first electrode lines provided on an upper surface of the base film; and
second electrode lines provided on a lower surface of the base film, and the routing wires comprise:
first routing wires provided on the upper surface of the base film and connected to the first electrode lines; and
second routing wires provided on the upper surface of the base film and connected to the second electrode lines through the via holes.

13. The display device of claim 12, further comprising a polarizing film disposed on the display panel,
wherein the touch sensors are disposed on the upper surface of the base film, between the base film and the polarizing film.

14. The display device of claim 12, wherein the touch sensors are placed on the lower surface of the base film facing the TFT substrate.

15. The touchscreen panel of claim 1, wherein the tail area has a first width and then a second width as it protrudes perpendicularly from the main area, the first width being greater than the second width.

* * * * *